Patented May 22, 1945

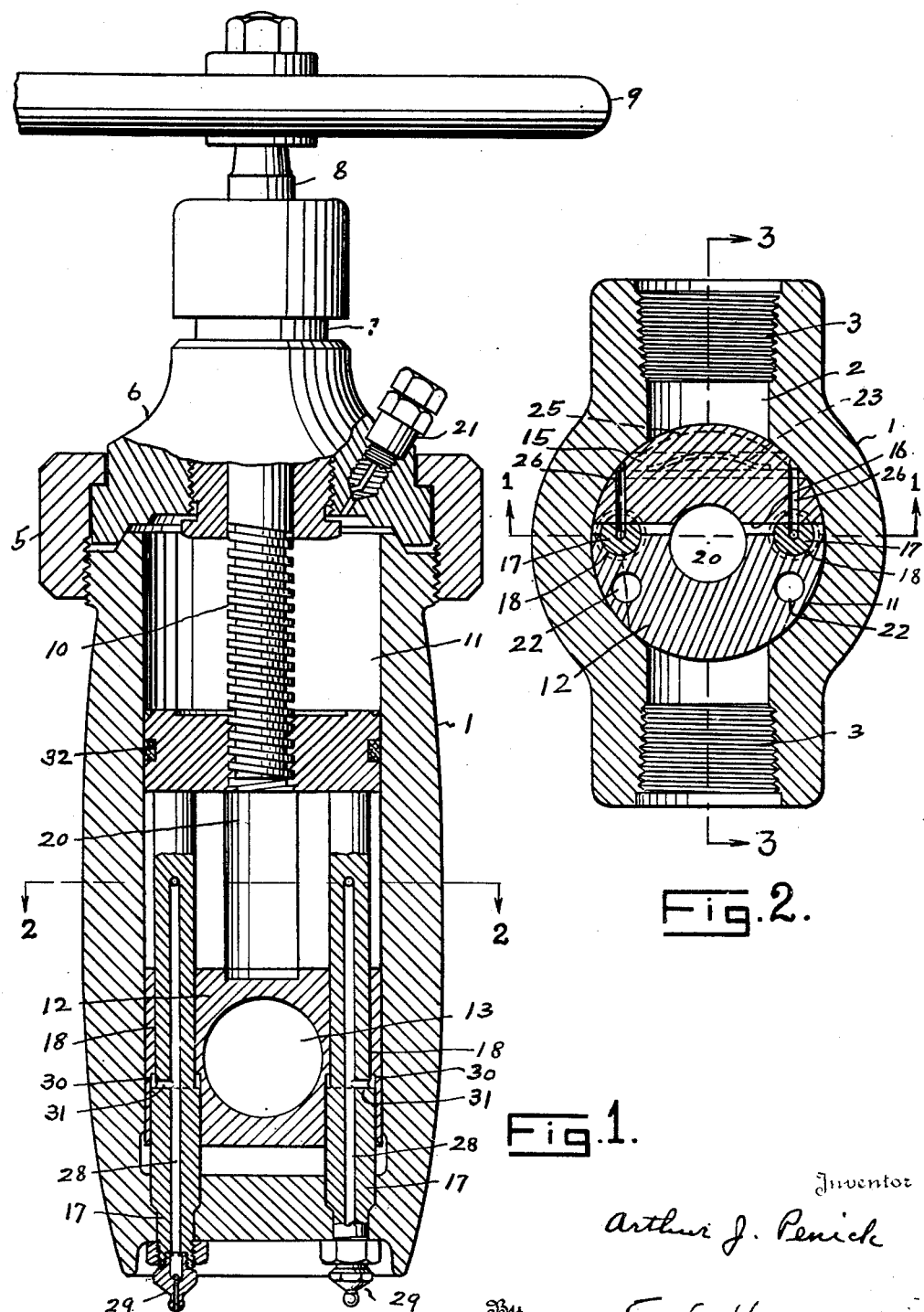

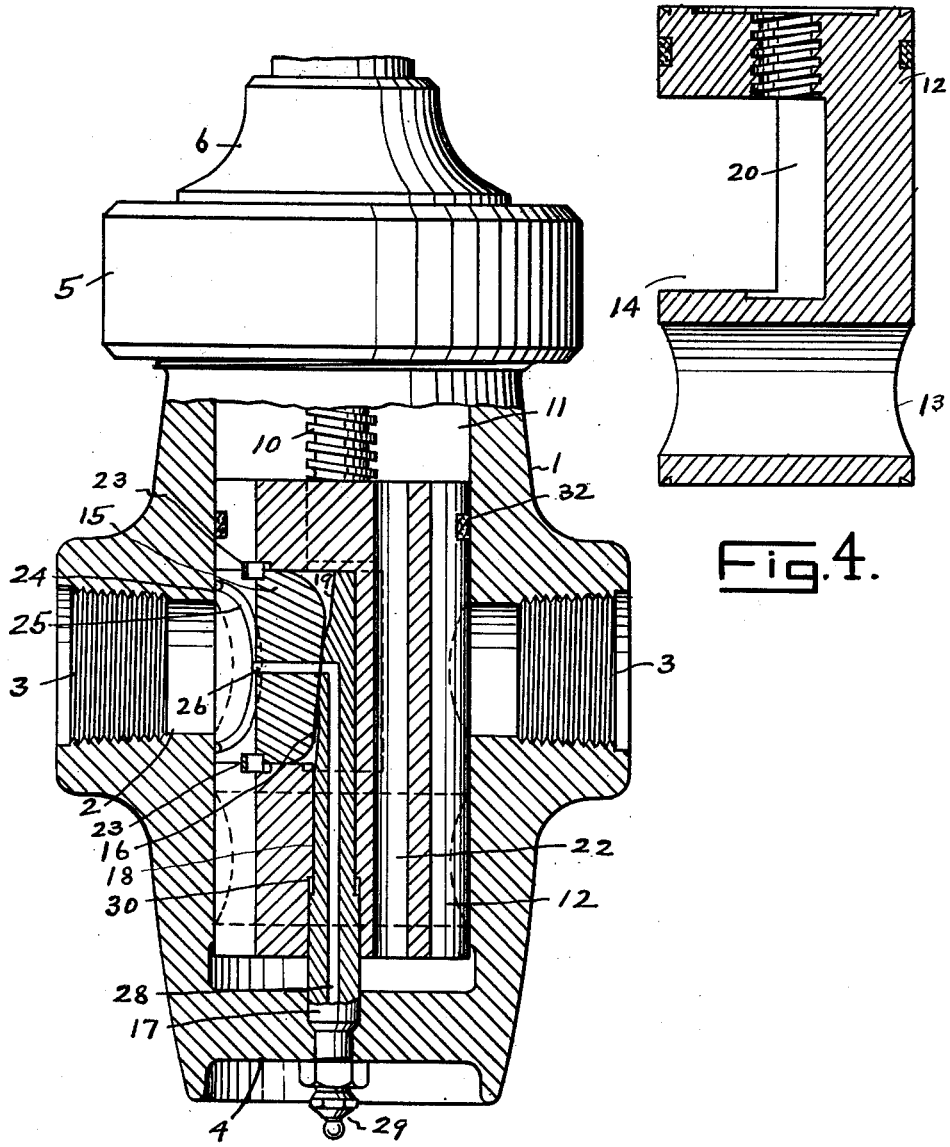

2,376,619

UNITED STATES PATENT OFFICE 2,376,619

VALVE ASSEMBLY

Arthur J. Penick, Houston, Tex.

Application August 19, 1944, Serial No. 550,279

1 Claim. (Cl. 251—68)

This invention relates to a valve assembly.

An object of the invention is to provide an assembly of the character described embodying a valve casing having a passageway therethrough for the flow of fluid and having a controlling assembly mounted in the casing and provided with a flowway therethrough movable into alignment with the passageway to form a continuous conduit through the casing, said assembly having a valve mounted therein and movable therewith with means to move the valve into close contact with the casing around the passageway to completely close the passageway to prevent the flow of fluid therethrough.

Another object of the invention is to provide novel means for lubricating the valve and valve seat around the passageway.

It is a further object of the invention to provide, in a valve of the character described, means for positively retracting the valve from its seat as the controlling assembly is moved to open position.

With the above and other objects in view the invention has particular relation to certain novel features of construction, operation and arrangement of parts, an example of which is given in this specification and illustrated in the accompanying drawings wherein—

Figure 1 shows a vertical, sectional view of the valve taken on the line 1—1 of Figure 2.

Figure 2 is a cross, sectional view taken on the line 2—2 of Figure 1.

Figure 3 is a longitudinal, sectional view taken on the line 3—3 of Figure 2; and Figure 4 shows a longitudinal, sectional view of the valve carrier.

Referring now more particularly to the drawings wherein like numerals of reference designate the same parts in each of the figures, the numeral 1 designates the valve casing which may be approximately cylindrical in shape and which has the passageway 2 for the flow of fluid therethrough whose ends are internally threaded as at 3, 3 for the connection of pipe thereto.

One end 4 of the casing is closed and clamped on the other end thereof, by the clamp nut 5, there is the bonnet 6 having a stuffing box 7 thereon through which the valve stem 8 works. Fixed on the outer end of this stem there is a hand wheel 9 and the inner end of the stem is formed with the coarse threads 10.

The interior of the casing 1 is formed with an approximately cylindrical chamber 11 in which the controlling assembly, hereinafter described, is movable.

This controlling assembly includes the valve carrier 12 which is of a general cylindrical shape and which fits closely within the chamber 11. It has a transverse flowway 13 therethrough and one side has a cut-away portion 14 to receive the valve 15.

The outer side of the valve 15 is convex to conform to the contour of the inside of the wall of the chamber 11 and the inner side of the valve has a tapering face 16.

Upstanding from the end 4 of the casing, and anchored thereto, are the posts 17, 17. These posts extend up through the bores 18, 18 of the carrier 12 and their upper ends have the tapering faces 19, 19 which bear against the face 16 of the valve.

The controlling assembly is formed with an axial bore 20 to receive the inner end of the valve stem 10 and the outer end of this bore is internally coarsely threaded to receive the threads 10 so that as the stem is rotated the controlling assembly will be moved longitudinally in the chamber 11.

This chamber 11 may be kept filled with a lubricant through the connection 21 provided for that purpose and the lubricant may flow from side to side of the assembly through the channels 22, 22 which extend longitudinally through the valve carrier 12.

The stem 10 may be rotated to move the controlling assembly into position to align the flowway 13 with the passageway 2. A continuous conduit will thus be provided through the valve assembly for the flow of fluid therethrough.

When the controlling assembly is moved to said open position the valve 15 will be retracted by means of the flat bow springs 23, 23 which are mounted in transverse grooves in the valve and which bear against the valve and an opposing shoulder of the carrier as indicated in Figures 2 and 3.

When the stem 10 is rotated in the reverse direction the assembly will be moved in the opposite direction, that is, into the position shown in Figure 1 and 3. When moved to this position the face 15 of the valve will ride against the faces 19, 19 of the posts with wedge like effect forcing the valve closely against the seat 24, around the passageway 2 as shown in Figure 2 and the reaction against the valve carrier 12 will force the opposite side of the carrier against the inside wall of the valve casing around the passageway 2 so as to completely close said passageway. The posts 17 are sufficiently flexible to allow this reaction of the valve carrier.

It will be noted that the seat 24 has an annular lubricant channel 25 therearound and the valve has the transverse ducts 26, 26 which register with said channel when the valve is in closed position. The posts 17 also have axial lubricant channels 28 leading from their outer ends and the outer ends of the posts are equipped with lubricant connections 29, 29 through which a lubricant may be forced into the ducts 28. The upper ends of the ducts 28 are outwardly turned, as shown in Figure 3, and register with the ducts 26, when the valve is closed and through these ducts a lubricant may be supplied to the contacting surfaces of the valve and its seat.

It will be noted that the outer ends of the bores 18 are enlarged in transverse diameter and that the posts 17 are correspondingly enlarged thus providing the chambers 30 and the lateral ducts 31 lead into these chambers from the ducts 28 as shown in Figure 1. When the controlling assembly is moved into open position it is evident that the chambers 30 will be enlarged and a lubricant may be added through the connections 29 to fill said enlarged chambers and when the controlling assembly is moved into position to close the valve 15 the chambers 30 will be contracted and the lubricant forced into the ducts 28 and on into the groove 25 so as to automatically supply a lubricant to the valve and its seat.

The valve carrier 12 may, if desired, be provided with a suitable packing 32, countersunk into one end thereof and forming a seal with the walls of the chamber 11.

What I claim is:

A valve assembly comprising a valve casing having a passageway for fluid therethrough and having a valve seat around the passageway, a controlling assembly in the casing including a carrier having a flowway therethrough and having a valve mounted in the carrier, said carrier having a longitudinal guide way and being movable to one position to align the flowway with the passageway and to another position to align the valve with the seat, a guide anchored to the casing and extended into the guide way, said guide way and guide being formed to provide a reserve chamber between them for a lubricant which is reduced in capacity as the carrier is moved to align the valve with the seat, said valve having a tapering face which co-acts with the guide to effect movement of the valve into contact with said seat when the valve is moved into alignment with the casing passageway, said guide and valve having a duct leading from said chamber through which the lubricant is forced from the chamber to the seat when the valve is moved to seated position.

ARTHUR J. PENICK.